United States Patent [19]

Brown et al.

[11] Patent Number: 4,885,348

[45] Date of Patent: Dec. 5, 1989

[54] UREA-MODIFIED ISOCYANATES

[75] Inventors: James P. Brown, Sterrebeek; Ernst O. Düber, Tervuren; Mark Loenders, Kessel-Lo, all of Belgium

[73] Assignee: Imperial Chemical Industries PLC, Welwyn Garden City, United Kingdom

[21] Appl. No.: 236,282

[22] Filed: Aug. 19, 1988

Related U.S. Application Data

[63] Continuation of Ser. No. 103,565, Oct. 1, 1987, abandoned.

[30] Foreign Application Priority Data

Oct. 6, 1986 [GB] United Kingdom ............... 8623971

[51] Int. Cl.$^4$ .............................................. C08L 75/00
[52] U.S. Cl. .................................. 525/458; 252/182.2
[58] Field of Search ...................... 525/458; 252/182.2

[56] References Cited

U.S. PATENT DOCUMENTS

| | | | |
|---|---|---|---|
| 3,392,183 | 7/1968 | Windemuth et al. | 260/453 |
| 3,622,534 | 11/1971 | Timmons et al. | 524/216 |
| 3,632,668 | 1/1972 | Kinney | 525/25 |
| 3,634,273 | 1/1972 | Marsh et al. | 252/170 |
| 4,036,797 | 7/1977 | Meader | 260/28 R |
| 4,264,519 | 4/1981 | Hennig et al. | 260/453 |
| 4,495,229 | 1/1985 | Wolf et al. | 427/388.2 |
| 4,572,100 | 2/1986 | Schonbackler et al. | 525/458 |
| 4,576,979 | 3/1986 | Schupp et al. | 523/404 |
| 4,608,416 | 8/1986 | Schupp et al. | 525/130 |
| 4,786,704 | 11/1988 | Hughes et al. | 528/65 |

FOREIGN PATENT DOCUMENTS

| | | |
|---|---|---|
| 0096210 | 4/1983 | European Pat. Off. . |
| 0103996 | 8/1983 | European Pat. Off. . |
| 0125438 | 3/1984 | European Pat. Off. . |
| 2119674 | 11/1971 | Fed. Rep. of Germany . |
| 2359929 | 6/1974 | Fed. Rep. of Germany . |
| 2360019 | 6/1974 | Fed. Rep. of Germany . |
| 2361429 | 6/1974 | Fed. Rep. of Germany . |
| 2751761 | 6/1978 | Fed. Rep. of Germany . |
| 3125402 | 1/1983 | Fed. Rep. of Germany . |
| 3138625 | 4/1983 | Fed. Rep. of Germany . |
| 211689 | 11/1982 | German Democratic Rep. . |
| 211931 | 11/1982 | German Democratic Rep. . |
| 59-42845 | 3/1984 | Japan . |
| 1501172 | 2/1978 | United Kingdom . |

*Primary Examiner*—Maurice J. Welsh
*Attorney, Agent, or Firm*—James T. Jones

[57] ABSTRACT

A dispersion in an aromatic polyisocyanate of a reaction product of the polyisocyanate and an amine having the formula:

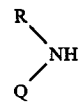

wherein Q represents hydrogen or hydrocarbyl and R represents a hydrocarbyl radical selected from radicals of the formulae:

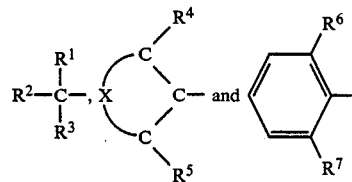

or wherein R and Q together with the attached nitrogen atom form a piperidine, morpholine or pyrolidine ring bearing a hydrocarbyl radical on at least one of the carbon atoms adjacent to the nitrogen atom.

8 Claims, No Drawings

UREA-MODIFIED ISOCYANATES

This is a continuation of copending application Ser. No. 07/103,565 filed on Oct. 1, 1987, now abandoned.

This invention relates to urea modified organic isocyanates and especially to dispersions of substituted ureas in organic polyisocyanates.

It is already known that organic isocyanates react with amines forming substituted ureas which, in general, are solid materials insoluble in the isocyanate. The reaction has been used to produce dispersions of finely divided polyureas in organic polyisocyanates which may then be used in polyurethane manufacture, the solid phase acting as a filler and providing improved physical properties in the polyurethane.

Because of the vigour with which many amines react with isocyanates, stable dispersions free from coarse precipitates and gels are obtained only by careful selection of the reactants and/or the reaction conditions.

Thus, in United Kingdom Pat. No. 1501172, it has been proposed to moderate the reaction between an organic polyisocyanate and a polyamine by employing a high molecular weight polyether as reaction medium.

Several other proposals, for example EP No. 103996, have been concerned with the use of polyamines of reduced activity such as isophorone diamine.

Yet another approach, described in U.S. Pat. No. 4,264,519, has been to use a special reaction vessel into which the reactants are injected under pressure and in a carefully defined manner.

It has now been found that stable, low viscosity, dispersions of urea modified isocyanates in organic polyisocyanates may be obtained without the need for complex mixing vessels or techniques by reacting the polyisocyanates with relatively simple primary or secondary mono-amines as hereinafter defined.

Accordingly, the invention provides a dispersion in an aromatic polyisocyanate of a reaction product of the polyisocyanate with amine characterized in that at least part of said amine has the formula:

wherein Q represents hydrogen or a hydrocarbyl radical containing from 1 to 20 carbon atoms and R represents a hydrocarbyl radical containing from 1 to 20 carbon atoms selected from:

(1) radicals of the formula:

wherein $R^1$ represents hydrogen or a hydrocarbyl radical and each of $R^2$ and $R^3$, which may be the same or different, represents a hydrocarbyl radical, $R^1$, $R^2$ and $R^3$ together containing at least three carbon atoms;

(2) cycloalkyl radicals of the formula:

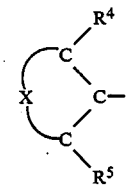

wherein X represents a chain of 2–4 carbon atoms, $R^4$ represents hydrogen or a hydrocarbyl radical and $R^5$ represents a hydrocarbyl radical; and (3) aryl radicals of the formula:

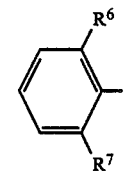

wherein $R^6$ represents a hydrocarbyl radical and $R^7$ represents a hydrocarbyl radical containing at least two carbon atoms, or wherein R and Q together with the attached nitrogen atom form a piperidine, morpholine or pyrolidine ring bearing a hydrocarbyl radical containing from 1 to 20 carbon atoms on at least one of the carbon atoms adjacent to the nitrogen atom.

The expressions "hydrocarbyl radical", "cycloalkyl radical" and "aryl radical" as used herein are intended to include the hydrocarbyl and aryl radicals as defined, as well as the corresponding radicals bearing substituents which are inert towards isocyanates and which do not substantially modify the solubility of the amine and/or of the isocyanate-amine reaction products in the polyisocyanate. Such substituted radicals, which for the purpose of the invention are equivalent to the radicals defined will be readily recognized by a person skilled in the art.

As examples of amines containing radicals of formula 1, there may be mentioned tert-butylamine, 1-methylbutylamine. Examples of amines containing radicals of formula 2 include 2-methylcyclohexylamine. Examples of amines containing radicals of formula 3 include 2-methyl-6-isopropylaniline, and 2,6-di-isopropylaniline. Examples of heterocyclic secondary amines include 2,6-dimethylpiperidine.

The organic polyisocyanates from which the dispersions of the invention are derived especially include those aromatic polyisocyanates, particularly diisocyanates, known for use in the manufacture of polyurethanes such as polyurethane foams and elastomers.

Of particular interest are for example tolylene diisocyanate and especially diphenylmethane diisocyanates (MDI) and its variants which are commercially available in a variety of forms. Suitable diphenylmethane isocyanates and variants thereof include (a) diphenylmethane-4'4-diisocyanate and mixtures thereof with other isomers of diphenylmethane diisocyanate;

(b) methylene bridged polyphenylpolyisocyanates prepared by phosgenation of mixtures of polyamines obtained by the condensation of aniline and formaldehyde and known in the art as "crude" or "polymeric" MDI;

(c) polymers and oligomers obtained by reacting diphenylmethane diisocyanates or "crude MDI" with a monomeric glycol or polyol (or mixtures thereof) or with a hydroxyl-ended polyester or polyether and known in the art as "MDI prepolymers"; and (d) modified diphenylmethane diisocyanates or "crude MDI" in which a proportion of the isocyanate groups are converted into other functional groups such as carbodiimide, isocyanurate, uretonimine or allophanate groups, or in which a proportion of the isocyanate groups are reacted with an isocyanate-reactive compound.

Mixtures of MDI variants may also be used if desired. Other polyisocyanates which may be used include aliphatic and cycloaliphatic polyisocyanates such as p-xylylene and dicyclohexylmethane diisocyanates.

The urea dispersion may be formed by adding the amine to the organic isocyanate over a period of time whilst stirring the mixture. As discussed above, there is no need to employ complex mixing techniques or apparatus such as that described in U.S. Pat. No. 4,264,519. Mixing can generally be effected using conventional equipment, for example a conventional stirrer or high-shear stirrer such as a SILVERSON (trade mark) stirrer. The reaction conveniently takes place at ambient temperature, although higher or lower temperatures may be used if desired. The temperature should not be sufficiently high to convert the dispersed urea particles into the corresponding biuret, and it is preferred that the temperature remains below 90 Deg. C. Temperatures in the range of 20 Deg. C. to 60 Deg. C. are preferred.

Preferably the amine is a liquid and is added to the organic isocyanate in that form. If a solid amine is used, it may be added in the form of a solution in a suitable inert solvent.

If the urea is to be formed from a modified diphenylmethane isocyanate (for example an MDI variant such as those described above), the amine may if desired be added during the formation of the MDI variant. Thus if an MDI variant is to be formed by the reaction of a diphenylmethane diisocyanate with for example a mixture of monomeric glycols, the amine may be added before or after the reaction of the diphenylmethane diisocyanate with the glycols, or the amine may be added at an intermediate stage after the reaction of the diphenylmethane diisocyanate with a portion of the glycols, the remainder of the glycols being added after the amine.

The present invention provides stable, mobile dispersions which are suitable for preparing polyurethane products of superior physical properties. The expression "stable" dispersion as used herein is not to be taken to imply that the dispersion obtained is indefinitely stable under all conditions. It is sufficient if the dispersion remains workable for a reasonable period of time having regard for its use in the preparation of polyurethane products. Equally, the settling of a minor proportion of the dispersed phase is not necessarily deleterious, provided that a good dispersion may be reformed on gentle stirring.

The dispersions are believed to contain both mono- and di-ureas. Thus, products derived from aromatic diisocyanates can be regarded as containing ureas of the general formula:

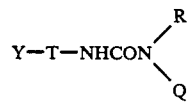

wherein T represents an anylene radical, Y represents an isocyanate radical or a residue of the formula:

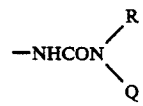

and R and Q are defined above.

Useful dispersions contain from 1 to 40% by weight of the isocyanate-amine reaction products based on the weight of the total composition, concentrations of from 3 to 20% by weight being preferred.

The dispersions of the invention, being modified polyisocyanates, may be used in the manufacture of polyurethanes, for example foams and elastomers, using conventional co-reactants and techniques. The viscosities of the dispersions are sufficiently low to permit processing in machinery conventionally used in polyurethane manufacture.

Thus, the dispersions may be reacted with organic polyols, for example polyether or polyester polyols, having functionalities and molecular weights appropriate to the type of polyurethane being made. The reaction may be performed in the presence of conventional additives which, again, will be appropriate to the type of polyurethane being prepared. Typical additives can include blowing agents such as water and trichlorofluoromethane, catalysts such as tertiary amines and tin compounds, surfactants such as siloxane-oxyalkylene copolymers, cross-linking agents, chain extenders, inorganic fillers, pigments and flame-retardants.

The replacement of conventional polyisocyanates by the dispersions of the invention can provide various improvements in the production and/or properties of foams and elastomers. Thus, in cold cure foam production, observed improvements can include higher hardness, better tear and tensile strengths at low densities whilst in the production of microcellular elastomers, lower densities can be obtained without shrinkage and other improvements including shorter demould times and generally better physical properties.

The dispersions can also be used to replace conventional polyisocyanates in other known reactions. These include reactions with polyamines to form polyureas and trimerisation reactions whereby polyisocyanurates are formed.

The invention is illustrated but not limited by the following examples.

EXAMPLE 1

Tert. Butylamine (45.2 g) was added dropwise under vigorous agitation with a high shear mixer to 4,4' MDI (1126.8 g) containing 16.5% 2,4' isomer and a minor amount of 2,2' isomer. The addition took place at 45 Deg. C. over a period of 30 min. After a postreaction time of 4 hours at 45 Deg. C. the mixture had an NCO value of 29.45% and a urea-content of 17.05%. It was a liquid dispersion at the stated temperature.

In order to keep the dispersion in a stable liquid state, polypropyleneglycol (288.0 g, MW: 2000, OH-value 56)

was added. After 90 min. at 80 Deg. C. crude MDI (540 g, NCO-content: 30.6%) was blended in and the reaction product was cooled to room temperature. A stable light brown dispersion was obtained with an NCO-content of 24.4%, viscosity 310 centi Poise at 25 Deg. C. and a urea-content of 10%.

EXAMPLE 2

1-Methylbutylamine (51.6 g) was added dropwise with rapid stirring (high shear mixer) to 4,4' MDI (1120.4 g) containing 16.5% of the 2,4' isomer and a minor amount of 2,2' isomer. The addition took place at 45 Deg. C. over a period of 15 min. After a postreaction time of 4 hours at 45 Deg. C., the mixture had an NCO value of 29.15% and a urea content of 17.05%. It was a liquid dispersion at the stated temperature. In order to keep the dispersion in a stable liquid state, polypropyleneglycol (288.0 g, MW: 2000, OH-value 56) was added. After 90 min. at 80 Deg. C. the reaction product was cooled to room temperature. A stable mobile white dispersion was obtained with an NCO-content of 21.8%, and a urea-content of 13.7%.

EXAMPLE 3

2-Methyl-6-isopropylaniline (74.8 g) was added dropwise with rapid stirring (high shear mixer) to 4,4' MDI (1097 g) containing 16.5% of the 2,4' isomer and minor amounts of 2,2' isomer. The addition took place at 45 Deg. C. over a period of 25 min. The mixture was then stirred for further 150 min. at the same temperature. At this stage the mixture was a liquid dispersion. It had an NCO value of 28.9% and a urea-content of 17.05%. In order to keep the dispersion in a stable liquid state, polypropyleneglycol (288.0 g, MW: 2000, OH-value 56) was added. After 90 min. at 80 Deg. C. crude MDI (540 g, NCO-content: 30.6%) was blended in and the reaction product was cooled to room temperature. A stable light brown dispersion was obtained with an NCO-content of 23.1%, viscosity of 532 centipoise at 25 Deg. C. and a urea-content of 10.0%.

EXAMPLE 4

T-Butylamine (72.32 g) was added dropwise under vigorous agitation with a high shear mixer to 4,4' MDI (2180.48 g) containing 2% 2,4' isomer and a minor amount of 2,2' isomer. The addition took place at 45 Deg. C. over a period of 20 min. The mixture was then stirred for further 4 hours at the same temperature. At this stage the mixture was a liquid dispersion. The NCO value was 30.05% and the urea-content was of 14.20%. In order to keep the dispersion in a stable liquid state, the mixture was heated at 80 Deg. C. and 947.2 g of poly(ethylene tetramethylene adipate) was added over a period of 20 minutes. The mixture was stirred for further 90 minutes at this temperature and subsequently cooled to 40 Deg. C. A white dispersion was obtained with an NCO content of 19.5%, viscosity 750 centipoise (60 deg. C.) and a urea content of 10.0%.

EXAMPLE 5

2-methyl-6-isopropylaniline (119.68 g) was added dropwise with rapid stirring (high shear mixer) to 4,4' MDI (2133,12 g) containing 2% of the 2,4' isomer and minor amounts of 2,2' isomer. The addition took place at 45 Deg. C. over a period of 30 minutes. The mixture was then stirred for further 4 hours at the same temperature. At this stage the product was liquid and had an NCO value of 29.5% and a urea-content of 14.20%.

In order to keep the dispersion in a stable liquid state, the mixture was heated at 80 Deg. C. and 949 g of poly(ethylene tetramethylene adipate) was added shotwise. After 90 min. at this temperature, the mixture was cooled to 40 Deg. C. A white dispersion was obtained with an NCO content of 18.4% and a urea-content of 10%.

COMPARATIVE EXAMPLE 2,6-Dimethylaniline was added dropwise at 45 Deg. C. with rapid stirring (high shear mixer) to 4,4' MDI (1107 g) containing 16.5% of the 2,4' isomer and minor amounts of 2,2' isomer. During the amine addition viscosity of the reaction mixture increased continuously and when 23 g of amine had been added this made stirring impossible. After a short time the reaction product solidified and the experiment was stopped.

We claim:

1. A dispersion in an aromatic polyisocyanate of a reaction product of the polyisocyanate with amine characterized in that at least part of said amine has the formula:

wherein Q represents hydrogen or a hydrocarbyl radical containing from 1 to 20 carbon atoms and R represents a hydrocarbyl radical containing from 1 to 20 carbon atoms selected from:

(1) radicals of the formula:

wherein $R^1$ represents hydrogen or a hydrocarbyl radical and each of $R^2$ and $R^3$, which may be the same or different, represents a hydrocarbyl radical, $R^1$, $R^2$ and $R^3$ together containing at least three carbon atoms;

(2) cycloalkyl radicals of the formula:

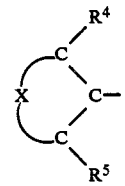

wherein X represents a chain of 2-4 carbon atoms, $R^4$ represents hydrogen or a hydrocarbyl radical and $R^5$ represents a hydrocarbyl radical; and (3) aryl radicals of the formula:

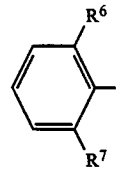

wherein $R^6$ represents a hydrocarbyl radical and $R^7$ represents a hydrocarbyl radical containing at least two carbon atoms, or wherein R and Q together with the attached nitrogen atom form a piperidine, morpholine or pyrolidine ring bearing a hydrocarbyl radical containing from 1 to 20 carbon atoms on at least one of the carbon atoms adjacent to the nitrogen atom.

2. A dispersion according to claim 1 wherein the hydrocarbyl radicals represented by $R^1$ to $R^7$ and Q are alkyl radicals.

3. A dispersion according to claim 1 wherein the amine is tert-butyl amine.

4. A dispersion according to claim 1 wherein the amine is 2-methyl-6-isopropylaniline.

5. A dispersion according to claim 1 wherein the organic polyisocyanate comprises diphenylmethane diisocyanate.

6. A dispersion according to claim 1 which contains from 1 to 40% of isocyanate-amine reaction product on a weight basis.

7. A dispersion according to claim 4 which contains from 3 to 20% of isocyanate-aminereaction product on a weight basis.

8. A method for the preparation of polyurethanes which comprises reacting an organic polyol with a dispersion according to claim 1.

* * * * *